Patented Dec. 3, 1940

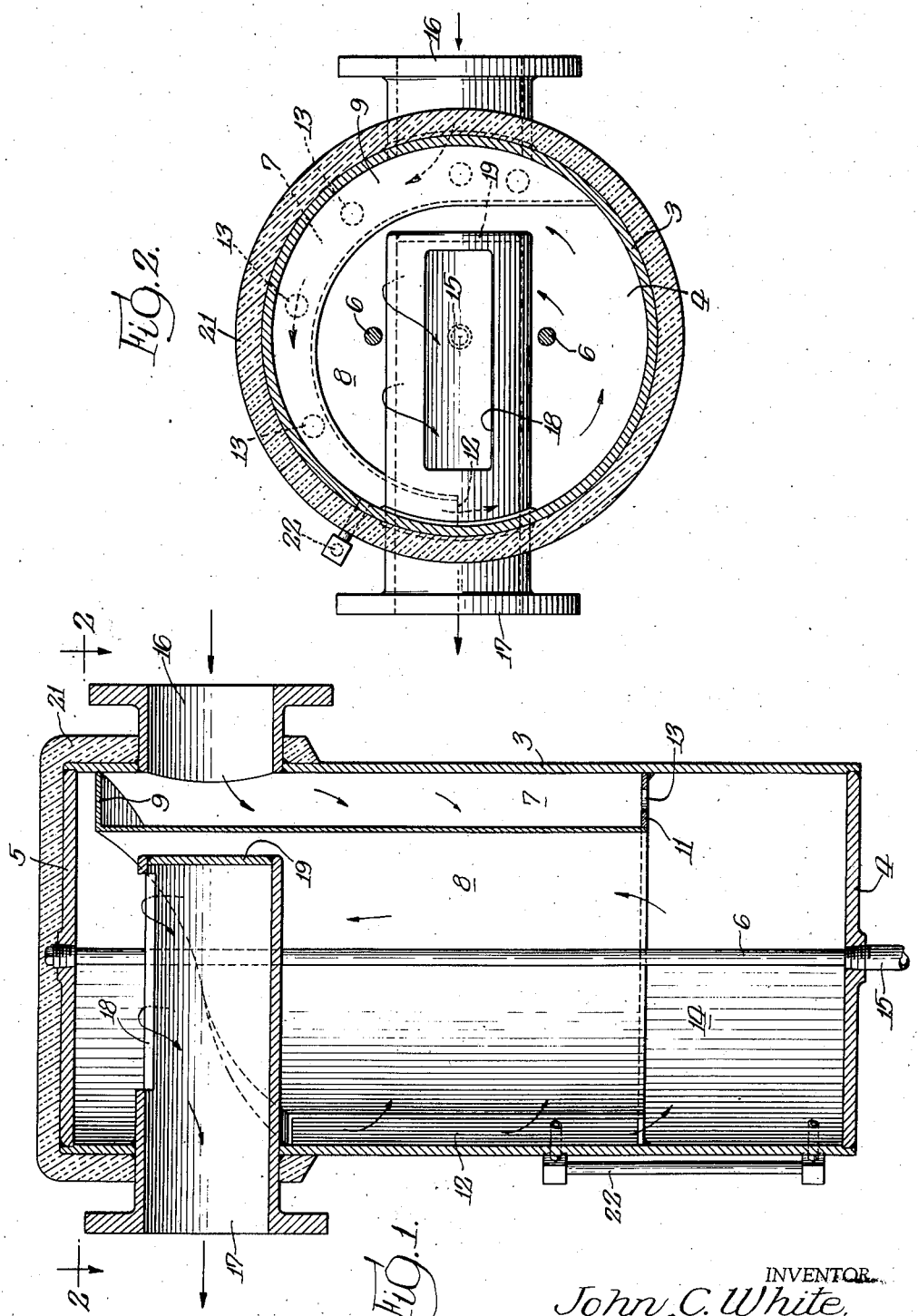

2,223,652

UNITED STATES PATENT OFFICE 2,223,652

OIL SEPARATOR

John C. White, Madison, Wis.

Application December 6, 1939, Serial No. 307,833

2 Claims. (Cl. 183—110)

This invention relates to separators for separating materials of different specific gravities and, while its principles may be utilized in separators for many purposes, I have here shown as an exemplification of the invention a separator particularly adapted for separating entrained water and oil from exhaust steam and preventing their again becoming intermingled.

In carrying out the principles of my invention, both gravity and centrifugal force are utilized in effecting the separation, and gravity, volume and temperature are employed in preventing separated entrainments from again being picked up or mingled with the current of steam, air or gas.

A preferred embodiment of my invention is illustrated on the accompanying drawing, referring to which:

Fig. 1 is a vertical mid-sectional view of a separator embodying the principles of my invention; and Fig. 2 is a transverse sectional view on the line 2—2 of Fig. 1.

Referring to the drawing more in detail, reference character 3 indicates the body or shell of the separator closed at its ends by the bottom 4 and top 5 which are secured against undue vibration under pulsating currents by the stay bolts 6.

Within the shell and above the bottom thereof is provided a separating passage 7, the outer wall of which is formed by the cylindrical shell, the inner wall 8 by an arcuate sheet metal member preferably flanged to provide the top wall 9 and having also a bottom wall 11 either formed integrally with or connected to the wall 8 and the shell 3.

The top and bottom walls 9 and 11 are of diminishing width from near the inlet end of the passage to the outlet end thereof, so that the passage 7 is of diminishing width toward its outlet or discharge end 12, and the top wall 9 inclines downwardly so that the passage is also of diminishing height toward its discharge end 12. The bottom wall 11 is provided with a plurality of drain openings 13, as shown. This bottom wall is also spaced upwardly from the bottom 4 of the shell so as to leave an unobstructed collecting or accumulating chamber 14 at the bottom of the separator in which the liquids are collected and from which they are drained through the drain pipe 15.

An inlet pipe 16 extends through the shell 3 to deliver the materials to be separated into the passage 7 near its larger end. An outlet pipe 17 extends through the opposite portion of the shell a considerable distance into the separator and is provided with an upwardly opening port or discharge opening 18 through which the steam or gas may escape from the separator by way of the pipe 17, the inner end of this pipe being closed by a wall 19. The pipes 16 and 17 are both located near the upper end of the separator and preferably, although not necessarily, in alignment, as shown. The upper portion of the separator is heat insulated by means of a cap or guard 21 of suitable insulating material. A gauge glass 22 is connected with the seperator near its lower end by which it may be determined whether the drainage from the separator is being effectively carried on.

In operation the steam or gas containing the entrained water and oil which are to be separated therefrom is delivered through pipe 16 into the larger end of the passage 7 in which it follows a curved path, thereby tending to throw the liquid particles against the shell of the separator. Some of the liquid thus centrifugally separated drops in the passage and is discharged therefrom through the drain openings 13 into the chamber 14. Due to the tapering character of the passage 7, the velocity of its contents is increased so that considerable velocity is attained at the discharge end 12 of the passage which causes the discharge to continue tangentially around the interior of the shell, thereby further facilitating the separation by centrifugal force and gravity of the liquid particles from the steam or gas.

The separated liquid is collected in the chamber 14 and drained off through the pipe 15, while the steam or gas rises in the center of the sperator and flows out through the elongated port 18 and the delivery pipe 17. The steam or other gas leaving the discharge end 12 of passage 7 on a tangent creates a whirling motion which prevents the picking up of entrainment, and the large area and volume of the central chamber, with its stabilized temperature, so increases the separating area and reduces the rate of upward flow of steam or gas that only dry vapor passes upward and drippings from the side walls are not picked up by the current, but run down and fall into the drainage area at the bottom.

The separated entrainment being near the outer walls and on the bottom of the separator loses heat by radiation, so that the production of flash steam which might carry with it particles of oil or water is prevented. The purified steam, being in the center of the separator, retains its heat as it passes upwardly to the outlet port in the heat insulated upper end of the separator and, therefore, does not deposit moisture on the inner surfaces of the separator. The drain pipe 15 is provided with a suitable trap (not shown), by which the removal of separated liquid is accomplished without waste of steam or gas.

While I have shown and described a preferred embodiment of the invention, the details thereof may obviously be varied within considerable limits without exceeding the scope of the invention as defined in the following claims.

I claim:

1. An oil separator comprising a cylindrical upright shell, a tapered arcuate passage therein spaced above the bottom of the shell to provide a collecting chamber therebeneath, the delivery end of said passage being smaller than the inlet end thereof and arranged to discharge tangentially into the interior of the shell, the upper portion of the shell being heat insulated and the lower portion being uninsulated, and means for discharging the steam or gas acted upon by the separator from a central point in the separator within the insulated area thereof.

2. An oil separator comprising a cylindrical upright shell, an arcuate tapered passage therein arranged to discharge at its smaller end tangentially into the interior of the shell, a collecting chamber beneath the passage, drain openings in the lower wall of said passage, a drain pipe leading from the bottom of said chamber, an inlet pipe positioned to deliver into the larger end of said passage, a delivery pipe extending into the central area of said separator, said pipe being provided with an upwardly opening delivery port, and means for insulating the upper portion of the shell.

JOHN C. WHITE.